Patented Apr. 19, 1932

1,854,687

UNITED STATES PATENT OFFICE

KARL BÜCHNER, OF VIENENBURG, GERMANY, ASSIGNOR TO PREUSSISCHE BERG-WERKS- UND HÜTTEN-AKTIENGESELLSCHAFT, OF BERLIN, GERMANY

EXTRACTION AND MANUFACTURE OF SULPHATE OF POTASSIUM FROM CALCIUM-CONTAINING SULPHATES

No Drawing. Application filed August 9, 1930, Serial No. 474,296, and in Germany March 15, 1929.

I have filed application for patent in Germany dated March 15th, 1929.

This invention has reference to the extraction and manufacture of sulphate of potassium from calcium-containing sulphates, and particularly from calcium-containing native sulphate rocks, such as poly-halit and the like, which constitute a mixture of sulphate of lime and of sulphates of at least one light metal, such as for instance sulphate of potassium or sulphate of magnesium, or a mixture containing chiefly sulphate of potassium and sulphate of magnesium. This process is substantially characterized by the fact that the raw material is exposed in the first stage of treatment to the action of an aqueous solution of a carbonic-acid compound of magnesium in the presence of free carbonic acid, whereupon the solution of potassium and magnesium-sulphates thereby obtained is separated from the carbonate of calcium, and is then submitted to further well-known treatment with a view of obtaining sulphate of potassium.

The multiple sulphates to be operated upon are treated for instance according to the invention in finely ground condition with carbonate of magnesium or with ores and minerals containing the same, such as magnesite or dolomite which are likewise finely ground and mixed up with water. By the mutual reaction of these two kinds of agents a solution of sulphates is obtained which is used as a basis for the manufacture of potassium sulphate by the treatment with potassium-chloride or the like. By the presence of carbonic acid, preferably under pressure, the procedure is facilitated and accelerated. For the purpose of carrying out this reaction of bi-carbonization of the solution of carbonate of magnesium, it is of advantage to employ carbonic-acid gas obtained by the purification of boiler-gases.

By the addition of small amounts of chloride of magnesium, which may be used most satisfactorily and cheaply in the form of sulphate-mother-liquor obtained in the process itself and containing about 8 percent of chloride of magnesium, the reaction may be still further assisted and accelerated. In this treatment the amount of chloride of magnesium contained in the sulphate-mother-liquor is preferably reduced to 2 to 4% by the addition of water.

The working temperatures for the carrying out of the process of this invention are preferably kept below 40 degrees C., particularly favorable results being obtained within the temperature limits of 40 to 50 degrees C. Instead of using carbonate of magnesium or minerals containing the same for the purpose of manufacturing carbonic-acid magnesium compounds or the bicarbonate compounds thereof, it will be of advantage for the economy of the working process to obtain the magnesium compound required for the reaction by precipitation with burnt lime from liquor containing chloride of magnesia, whereby magnesiumhydroxid (so-called magnesia) is obtained. The sulphate-mother liquor resulting from the process of the invention may be utilized in this connection for the formation of magnesium-hydroxid by precipitation with burnt lime in a very advantageous and economical manner. As an important advantage of this invention as compared with the well known use of caustic lime it should be noted that the entire sulphuric acid is obtained in solution, so that it may be further utilized instead of being lost by the formation of gypsum.

The reaction on which the treatment of the polyhalit is based, takes place according to the following equation:—

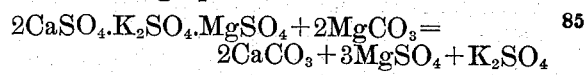

$2CaSO_4.K_2SO_4.MgSO_4 + 2MgCO_3 =$
$2CaCO_3 + 3MgSO_4 + K_2SO_4$

*Example I.*—69 kilograms polyhalit very finely ground are stirred up with 18 kilograms finely ground magnesite and 200 liters water for 24 hours, and preferably under pressure and in the presence of carbonic acid, until the liquid becomes saturated with the carbonic acid which may for instance be obtained from purified boiler gases. Then remove the calcium-carbonate obtained by filtration, and the potassium-magnesia-liquor is treated, so as to obtain potassium-sulphate therefrom.

*Example II.*—200 liters chloride-of-magnesia liquor are stirred up with 52 kilograms burnt lime, and the precipitate of magnesia is well washed after the reaction is finished. The precipitate of magnesia is stirred up with 65 kilograms krugite

and with 250 liters water or with an equivalent amount of washing liquor resulting from the reaction, and at a temperature of about 40 to 50 degrees C. for 24 hours while passing carbonic acid gas through the liquor. The resulting liquor is separated from the calcium-containing mud, and into the liquor chloride of potash is introduced in the well known manner, until the liquor has become saturated with combined chlorine, it being known that potassium-chloride in sufficient amount will decompose sulphates and the potassium-sulphate obtained is separated off from the mother-liquor.

It should be understood that, while the description refers to a preferred form of exemplification by way of illustrating the principle of the invention, it is not restricted to this particular embodiment, but modifications and changes of proportions and conditions may occur without deviating from the scope of the invention as defined in the appended claims.

I claim:—

1. The process of manufacturing sulphate of potassium, which comprises treating a liquor containing polysulphates of magnesium, lime and light-metals with magnesia and with carbonic acid, thereby precipitating the calcium, separating the precipitate from the liquid and obtaining sulphate of potash from said liquid.

2. The process of manufacturing sulphate of potassium, which comprises treating polysulphates of magnesium-lime and light-metals with carbonate of magnesium, separating the precipitate from the liquor and extracting sulphate of potash from the liquor.

3. The process of manufacturing sulphate of potassium, which comprises treating polysulphates of magnesium-lime and light metals with carbonic acid and a magnesium-compound, separating the resulting precipitate from the liquor, saturating any existing free sulphuric acid in the liquor with potassium-salt, and withdrawing the potassium-sulphate formed from said liquor.

4. The process of manufacturing sulphate of potassium, which comprises treating lime-containing polysulphates of magnesium and of potassium with magnesium-compounds and with carbonic acid at temperatures around 40 to 50 degrees C., but below 60 degrees C., and in the presence of chloride of magnesium, removing the lime precipitate, and obtaining potassium compounds from the resulting liquor.

5. The process of manufacturing sulphate of potassium, which comprises treating mother-liquor containing sulphates and chloride of magnesium with a precipitant, and precipitating magnesium-hydroxid therefrom, then treating lime-containing polysulphates of magnesium and of potassium with said magnesium-hydroxid in the presence of carbonic acid, thereby precipitating the lime, and treating the resulting liquor, so as to obtain sulphate of potash therefrom, and separating magnesium compound from the then resulting mother-liquor.

6. The process of manufacturing sulphate of potash, which comprises treating mother-liquor of chloride of magnesium with caustic lime, removing the resulting magnesia precipitate, and adding said precipitate to a solution of lime-containing polysulphate of magnesium and of other light metals, treating the mixture with carbonic acid gas, separating off the lime-precipitate, and extracting sulphate of potash from the then resulting liquor.

7. The process of manufacturing sulphate of potash, which comprises treating a mixture of lime-containing polysulphate of magnesium and other light-metals with a solution of carbonate of magnesium in the presence of carbonic acid gas and of chloride of magnesium, separating the liquid from the resulting precipitate, and separating sulphate of potash from the resulting liquid.

8. The process of manufacturing sulphate of potassium, which comprises treating a mixture of polysulphate of magnesium, lime and potassium at temperatures below 60 degrees centigrade with magnesia and with carbonic acid, thereby precipitating calcium carbonate, separating said precipitate from the liquor, and obtaining sulphate of potassium from said liquor.

9. The process of manufacturing sulphate of potassium, which comprises treating a mixture of sulphates of lime, magnesium and of alkali at a temperature not exceeding about sixty degrees centigrade with a sufficient amount of carbonic acid to precipitate the lime in the presence of potassium salts, separating the calcium containing precipitate from the liquor, and extracting sulphate of potassium from said liquor.

10. The process of manufacturing sulphate of potassium, which comprises treating a mixture of polysulphates of lime, magnesium and of alkali at a temperature not above about sixty degrees centigrade with a sufficient amount of carbonate of magnesium to precipitate the lime, removing the calcium containing precipitate, adding potassium chloride to the liquor, thereby decomposing the sulphates therein, and extracting potassium sulphate from the liquor thus treated.

In testimony whereof I affix my signature.

Dr. KARL BÜCHNER.